US010679795B2

(12) United States Patent
Yamaguchi et al.

(10) Patent No.: US 10,679,795 B2
(45) Date of Patent: *Jun. 9, 2020

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Nobuyuki Yamaguchi, Saga (JP); Koji Fukuchi, Saga (JP); Tetsuro Iwasa, Kyoto (JP); Koji Okamoto, Kyoto (JP); Takahiro Kobayashi, Saga (JP); Yasuo Tanaka, Shiga (JP); Ryo Morioka, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,500

(22) Filed: Dec. 14, 2017

(65) Prior Publication Data

US 2018/0108488 A1      Apr. 19, 2018

Related U.S. Application Data

(63) Continuation of application No. PCT/JP2016/003078, filed on Jun. 27, 2016.

(30) Foreign Application Priority Data

Jun. 30, 2015   (JP) .................................. 2015-131918

(51) Int. Cl.
*H01G 9/048*       (2006.01)
*H01G 9/042*       (2006.01)
(Continued)

(52) U.S. Cl.
CPC ........... *H01G 9/048* (2013.01); *H01G 9/0036* (2013.01); *H01G 9/028* (2013.01); *H01G 9/0425* (2013.01)

(58) Field of Classification Search
CPC .............................. H01G 9/028; H01G 9/025
See application file for complete search history.

(56) References Cited

U.S. PATENT DOCUMENTS

| | | |
|---|---|---|
| 6,001,281 A | 12/1999 | Lessner et al. |
| 2005/0111165 A1 | 5/2005 | Merker et al. |

(Continued)

FOREIGN PATENT DOCUMENTS

| | | |
|---|---|---|
| CN | 101136285 A | 3/2008 |
| CN | 102005313 A | 4/2011 |

(Continued)

OTHER PUBLICATIONS

English Translation of Chinese Search Report dated Mar. 21, 2019 for the related Chinese Patent Application No. 201680037572.4.

(Continued)

*Primary Examiner* — Eric W Thomas
(74) *Attorney, Agent, or Firm* — McDermott Will & Emery LLP

(57) ABSTRACT

An electrolytic capacitor includes an anode body, a dielectric layer formed on the anode body, a first conductive polymer layer covering at least a part of the dielectric layer, and a second conductive polymer layer covering at least a part of the first conductive polymer layer. The first conductive polymer layer contains a first conductive polymer and a first silane compound. The second conductive polymer layer contains a second conductive polymer and a basic compound. The basic compound may be an amine compound.

10 Claims, 1 Drawing Sheet

(51) Int. Cl.
*H01G 9/028* (2006.01)
*H01G 9/00* (2006.01)

(56) References Cited

U.S. PATENT DOCUMENTS

| | | |
|---|---|---|
| 2008/0005878 A1 | 1/2008 | Merker et al. |
| 2008/0316680 A1 | 12/2008 | Iida et al. |
| 2009/0021894 A1 | 1/2009 | Ning et al. |
| 2011/0051321 A1 | 3/2011 | Yamaguchi et al. |
| 2012/0044615 A1 | 2/2012 | Takahashi et al. |
| 2012/0057275 A1 | 3/2012 | Intelmann et al. |
| 2014/0063691 A1 | 3/2014 | Kosuge et al. |
| 2016/0163466 A1* | 6/2016 | Naito ............ H01G 9/15 361/525 |

FOREIGN PATENT DOCUMENTS

| | | |
|---|---|---|
| JP | 2002-524593 | 8/2002 |
| JP | 2005-123630 | 5/2005 |
| JP | 2010-177421 | 8/2010 |
| JP | 2011-049458 | 3/2011 |
| JP | 2012-043958 | 3/2012 |
| JP | 2012-114128 A | 6/2012 |
| JP | 2012-517113 | 7/2012 |
| JP | 2012-174948 A | 9/2012 |
| WO | 2007/031206 | 3/2007 |
| WO | 2007/091656 | 8/2007 |

OTHER PUBLICATIONS

International Search Report of PCT application No. PCT/JP2016/003078 dated Sep. 6, 2016.
Chinese Search Report issued in related Chinese Application No. 201680043963.7, dated Apr. 28, 2019.
International Search Report issued in related International Application No. PCT/JP2016/003441, dated Sep. 27, 2016, with English translation.
Notice of Allowance issued in related U.S. Appl. No. 15/870,839, dated Jul. 17, 2019.
Non-Final Office Action issued in related U.S. Appl. No. 15/870,839, dated Jan. 4, 2019.

* cited by examiner

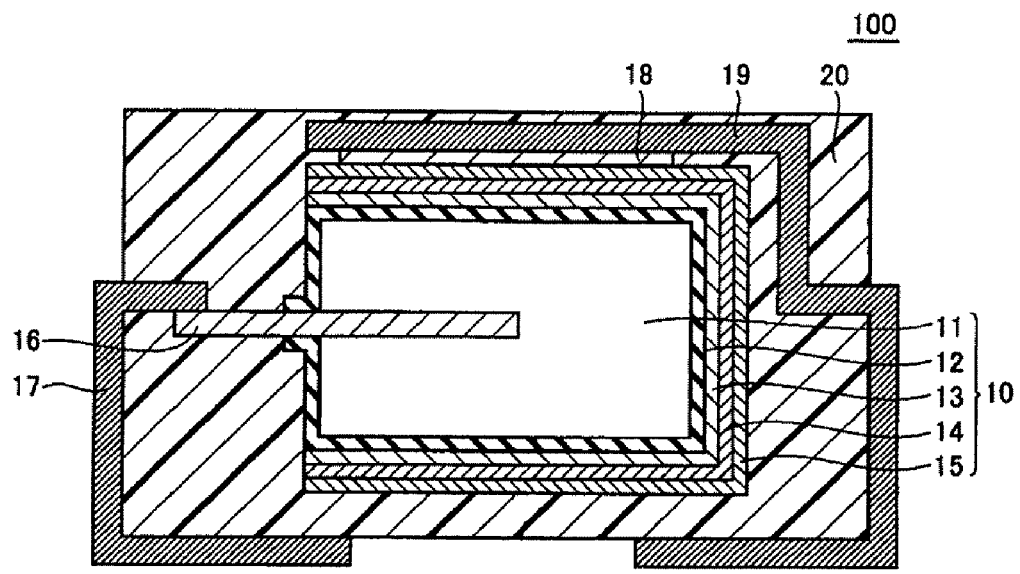

ELECTROLYTIC CAPACITOR AND METHOD FOR MANUFACTURING SAME

RELATED APPLICATIONS

This application is a continuation of the PCT International Application No. PCT/JP2016/003078, filed on Jun. 27, 2016, which claims the benefit of foreign priority of Japanese patent application No. 2015-131918, filed on Jun. 30, 2015, the contents all of which are incorporated herein by reference.

BACKGROUND

1. Technical Field

The present disclosure relates to an electrolytic capacitor having a conductive polymer layer, and a method for manufacturing the electrolytic capacitor.

2. Description of the Related Art

As small-sized, large capacitance, and low equivalent series resistance (ESR) capacitors, promising candidates are electrolytic capacitors including an anode body on which a dielectric layer is formed and a conductive polymer layer formed so as to cover at least a part of the dielectric layer. The conductive polymer layer includes a conductive polymer such as a π-conjugated polymer.

Formation of a plurality of conductive polymer layers for improving performance of an electrolytic capacitor has been proposed. Unexamined Japanese Patent Publication (Translation of PCT Application) No. 2002-524593 discloses that, in preparation of an electrolytic capacitor, a first conductive polymer layer is formed by immersing an anode body subjected to an anodizing treatment in a solution containing a monomer of a conductive polymer, an oxidant and so on, and polymerizing the monomer, and subsequently a second conductive polymer layer is formed by using a conductive polymer dispersion liquid. Unexamined Japanese Patent Publication No. 2012-043958 suggests that a layer of an amine compound is provided between a first conductive polymer layer and a second conductive polymer layer for improving adhesion of the conductive polymer layers, or is provided in the second conductive polymer layer for improving adhesion of the conductive polymer layers.

In electrolytic capacitors including such conductive polymer layers, the upper limit of the range in a working voltage has been rising year after year. Thus, further improvement of withstand voltage characteristics of electrolytic capacitors is required.

SUMMARY

An electrolytic capacitor according to a first aspect of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer contains a first conductive polymer and a first silane compound. The second conductive polymer layer contains a second conductive polymer and a basic compound.

According to the first aspect of the present disclosure, it is possible to improve withstand voltage characteristics of an electrolytic capacitor.

A method for manufacturing an electrolytic capacitor according to a second aspect of the present disclosure includes the following steps. A first step includes forming a first conductive polymer layer on a dielectric layer of an anode body provided with the dielectric layer, the first conductive polymer layer containing a first conductive polymer and a first silane compound, and covering at least a part of the dielectric layer. A second step includes forming a second conductive polymer layer on the first conductive polymer layer, the second conductive polymer layer containing a second conductive polymer and a basic compound, and covering at least a part of the first conductive polymer layer.

According to the second aspect of the present disclosure, it is possible to manufacture an electrolytic capacitor excellent in withstand voltage characteristics.

BRIEF DESCRIPTION OF THE DRAWING

FIGURE is a sectional view schematically illustrating a configuration of an electrolytic capacitor according to an exemplary embodiment of the present disclosure.

DETAILED DESCRIPTION OF EMBODIMENT

[Electrolytic Capacitor]

An electrolytic capacitor according to an exemplary embodiment of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer contains a first conductive polymer and a silane compound (first silane compound). The second conductive polymer layer contains a second conductive polymer and a basic compound.

In the present exemplary embodiment, this configuration improves withstand voltage characteristics of the electrolytic capacitor. This phenomenon is considered to be due to the following reasons although details of the phenomenon are not clear.

As a first reason, it is considered that the first silane compound contained in the first conductive polymer layer, and the basic compound contained in the second conductive polymer layer interact or are bonded with each other, resulting in improvement of adhesion between the first conductive polymer layer and the second conductive polymer layer.

In addition, the first conductive polymer layer containing the first silane compound tends to have low affinity for a solvent, and thus it is difficult to cover the first conductive polymer layer with the second conductive polymer layer. However, in formation of the second conductive polymer layer, an amine compound (the basic compound) comes into contact with the first conductive polymer layer, so that affinity for a solvent is improved. Accordingly, as a second reason, it is considered that a surface of the first conductive polymer layer is easily covered with a treatment liquid which is used in formation of the second conductive polymer layer and which contains a second conductive polymer, so that coverage property of the first conductive polymer layer with respect to the second conductive polymer layer is improved.

FIGURE is a sectional view schematically illustrating a configuration of an electrolytic capacitor according to an exemplary embodiment of the present disclosure. In FIGURE, electrolytic capacitor 100 includes capacitor element 10 including anode body 11 with dielectric layer 12 formed on a surface of anode body 11, conductive polymer layer 13 formed on dielectric layer 12, and a cathode layer formed on conductive polymer layer 13. The cathode layer includes carbon layer 14 as a cathode extraction layer, and silver paste layer 15.

Electrolytic capacitor 100 further includes anode lead 16, anode terminal 17, adhesive layer 18, and cathode terminal 19. Anode lead 16 is a rod-like body composed of a valve metal (tantalum, niobium, titanium, aluminum or the like), and is disposed in such a manner that anode lead 16 is embedded in anode body 11 at one end, and protrudes outside capacitor element 10 at the other end. Anode terminal 17 is partially connected to anode lead 16 by welding. In addition, cathode terminal 19 is disposed so as to be connected to silver paste layer 15 as the outermost layer of capacitor element 10 through adhesive layer 18 composed of a conductive adhesive.

Electrolytic capacitor 100 further includes outer packing resin 20. Outer packing resin 20 seals capacitor element 10 provided with anode lead 16, anode terminal 17, adhesive layer 18 and cathode terminal 19 in such a manner that a portion of anode terminal 17 and a portion of cathode terminal 19 are exposed from outer packing resin 20.

Conductive polymer layer 13 includes a first conductive polymer layer and a second conductive polymer layer. The first conductive polymer layer is formed so as to cover dielectric layer 12, and the second conductive polymer layer is formed so as to cover the first conductive polymer layer. The first conductive polymer layer does not necessarily cover whole (a whole surface of) dielectric layer 12, and is satisfactory as long as the first conductive polymer layer is formed so as to cover at least a part of dielectric layer 12. Similarly, the second conductive polymer layer does not necessarily cover the whole (a whole surface of) first conductive polymer layer, and is satisfactory as long as the second conductive polymer layer is formed so as to cover at least a part of the first conductive polymer layer. In general, a layer containing a conductive polymer may be referred to as a solid electrolyte layer.

Dielectric layer 12 is formed along the surface of anode body 11, and therefore irregularities are formed on a surface of dielectric layer 12 in accordance with a shape of the surface of anode body 11. Preferably, the first conductive polymer layer is formed so as to fill such irregularities of dielectric layer 12.

Hereinafter, a configuration of the electrolytic capacitor is described more in detail.
(Anode Body)

A conductive material having a large surface area can be used for the anode body. Examples of the conductive material may include valve metals, alloys containing a valve metal, and compounds containing a valve metal. These materials can be used alone or in combination of two or more materials. As the valve metal, for example, tantalum, niobium, titanium or aluminum is preferably used. Examples of the anode body include a molded body of particles of a conductive material, a sintered body of the molded body, and a substrate (e.g. foil-like or plate-like substrate) formed of a conductive material and having a roughened surface. The sintered body has a porous structure.
(Dielectric Layer)

The dielectric layer is formed by anodizing, through an anodizing treatment or the like, the conductive material on a surface of the anode body. As a result of anodizing, the dielectric layer contains an oxide of the conductive material (particularly a valve metal). For example, the dielectric layer contains $Ta_2O_5$ when tantalum is used as the valve metal, and the dielectric layer contains $Al_2O_3$ when aluminum is used as the valve metal. The dielectric layer is not limited to these examples, and a layer is acceptable as the dielectric layer as long as the layer functions as a dielectric body.

When a surface of the anode body is roughened, or the anode body is porous, the dielectric layer is formed along a surface of the anode body (which includes an inner wall surface of pits inside the surface of the anode body).
(First Conductive Polymer Layer)

The first conductive polymer layer contains a conductive polymer (first conductive polymer) and a silane compound (first silane compound), and may further contain a dopant (first dopant). In the first conductive polymer layer, the dopant may be contained with the conductive polymer doped with the dopant, or may be contained with the dopant bonded with the conductive polymer. The first conductive polymer layer may be formed of one layer, or may be formed of a plurality of layers.
(Conductive Polymer)

As the conductive polymer, there can be used, for example, a publicly known polymer used for an electrolytic capacitor, such as a π-conjugated conductive polymer. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more kinds of monomers, and derivatives (e.g., a substitute having a substituent) of these polymers. For example, polythiophene includes poly(3,4-ethylenedioxythiophene) or the like. Such a conductive polymer has high conductivity and excellent ESR characteristics.

These conductive polymers may be used alone or in combination of two or more conductive polymers.

A weight average molecular weight of the conductive polymer is not particularly limited, and ranges, for example, from 1,000 to 1,000,000, inclusive.

The conductive polymer can be obtained by, for example, polymerizing a precursor of the conductive polymer. The conductive polymer that is bonded to or doped with the dopant can be obtained by polymerizing a precursor of the conductive polymer under existence of the dopant. The polymerization may be performed under existence of a silane compound. Examples of the precursor of the conductive polymer may include a monomer that constitutes the conductive polymer and/or an oligomer in which some monomers are linked to each other. As a polymerization method, both chemical oxidation polymerization and electrolytic oxidation polymerization can be employed. The conductive polymer may be synthesized before being deposited the anode body including the dielectric layer. For chemical oxidation polymerization, the polymerization of the conductive polymer may be performed on the dielectric layer.

The first conductive polymer is preferably obtained by polymerizing a precursor of the first conductive polymer on the dielectric layer. Here, the first conductive polymer penetrates into pores of a surface of the anode body and inner wall surfaces of pits, so that the first conductive polymer layer is easily formed, and adhesion and covering property between the dielectric layer and the first conductive polymer layer are easily improved.
(Silane Compound)

The silane compound (first silane compound) is not particularly limited, and for example, a silicon-containing organic compound can be used. The silane compound may be at least partially caught in the first conductive polymer layer. The silane compound may be interposed between first conductive polymers, or between the first conductive polymer and other component such as the first dopant, and chemically bonded with these components. Here, the first conductive polymer is firmly bonded, and further, withstand voltage characteristics are improved. A part of the silane compound or a silicon-containing component derived from the silane compound may be present at an interface between the dielectric layer and the first conductive polymer layer. Here, the silane compound contributes to improvement of adhesion.

As the silane compound, for example, a silane coupling agent can be used. The silane coupling agent has a reactive organic group and a hydrolysis condensation group. The reactive organic group is preferably an epoxy group, an alkyl halide group, an amino group, an ureido group, a mercapto group, an isocyanate group, a polymerizable group or the like. Examples of the polymerizable group include (meth) acryloyl groups and vinyl groups. When a silane coupling agent having such a reactive organic group is used as the silane compound, the reactive organic group and a basic compound easily interact or react with each other. Accordingly, adhesion between the first conductive polymer layer and the second conductive polymer layer is easily further improved. An acryloyl group and a methacryloyl group are collectively referred to as a (meth)acryloyl group. The hydrolysis condensation group is preferably an alkoxy group such as, for example, a methoxy group, an ethoxy group or a propoxy group. The silane coupling agents include hydrolyzates and condensates of the silane coupling agent.

Examples of the silane coupling agent having an epoxy group may include 2-(3,4-epoxycyclohexyl)ethyltrimethoxysilane, 3-glycidoxypropyltrimethoxysilane (γ-glycidoxypropyltrimethoxysilane), 3-glycidoxypropylmethyldiethoxysilane and 3-glycidoxypropyltriethoxysilane. Examples of the silane coupling agent having an alkyl halide group include 3-chloropropyltrimethoxysilane.

Examples of the silane coupling agent having an amino group may include N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane and salts (e.g. hydrochlorides) of these compounds. Examples of the silane coupling agent having an ureido group include 3-ureidopropyltriethoxysilane and salts (e.g. hydrochlorides) of the compound.

Examples of the silane coupling agent having a mercapto group may include 3-mercaptopropylmethyldimethoxysilane, 3-mercaptopropyltrimethoxysilane and bis(triethoxysilylpropyl)tetrasulfide. Examples of the silane coupling agent having an isocyanate group include 3-isocyanatepropyltriethoxysilane.

Examples of the silane coupling agent having a (meth) acryloyl group may include 3-methacryloxypropylmethyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane (γ-acryloxypropyltrimethoxysilane). Examples of the silane coupling agent having a vinyl group may include vinyltrichlorosilane, vinyltrimethoxysilane, vinyltriethoxysilane and p-styryltrimethoxysilane.

These silane compounds may be used alone, or two or more of the silane compounds may be used in combination.

Among silane compounds, silane coupling agents having an epoxy group or a (meth)acryloyl group are preferable in view of reducing ESR and easily enhancing a capacitance.

The silane compound contained in the first conductive polymer layer can be examined by, for example, energy dispersive X-ray spectroscopy (EDX) or induction coupling plasma analysis (ICP).

A content of the silane compound in the first conductive polymer layer ranges, for example, from 1 part by mass to 20 parts by mass, inclusive, preferably from 3 parts by mass to 15 parts by mass, inclusive, with respect to 100 parts by mass of the first conductive polymer. When the content of the silane compound falls within such a range, withstand voltage characteristics can be further improved.

(Dopant)

Examples of the first dopant include low-molecular-weight dopants and high-molecular-weight dopants. The first conductive polymer layer may contain one dopant, or two or more dopants.

As the first dopant, for example, one having an anionic group such as a sulfonate group, a carboxylate group, a phosphate group (—O—P(=O)(—OH)$_2$), and/or a phosphonate group (—P(=O)(—OH)$_2$) is used. The first dopant may include one anionic group, or two or more anionic groups.

As the anionic group, a sulfonate group is preferred, and a combination of the sulfonate group with an anionic group other than the sulfonate group may also be used.

As the low-molecular-weight dopant, a low-molecular-weight compound (monomer compound) having an anionic group as described above can be used. Specific examples of the compound having a sulfonate group, among the compounds described above, include benzenesulfonic acid, alkylbenzenesulfonic acids such as p-toluenesulfonic acid, naphthalenesulfonic acid, and anthraquinonesulfonic acid.

Examples of the polymer dopant having a sulfonate group, among polymer dopants, may include homopolymers of a monomer having a sulfonate group (first monomer), copolymers of the first monomer with another monomer (second monomer), sulfonated phenolic resins (sulfonated phenolic novolak resins, etc). In the polymer dopant, the first monomer and the second monomer may each be used alone or in combination of two or more monomers.

Examples of the first monomer may include vinylsulfonic acid, allylsulfonic acid, 2-acrylamido-2-methylpropanesulfonic acid, styrenesulfonic acid, and isoprenesulfonic acid. Among these first monomers, it is preferred to use at least an aromatic vinyl monomer having a sulfonate group, such as styrenesulfonic acid. As the second monomer, a monomer not having an anionic group or the like can be used, but a monomer having an anionic group other than a sulfonate group is preferably used.

Also, the polymer dopant is preferably a polyester having a sulfonate group, or the like. Examples of the polyester having a sulfonate group include polyesters including, as the first monomer, a polycarboxylic acid having a sulfonate group and/or a polyol having a sulfonate group, and, as the second monomer, a polycarboxylic acid and a polyol. As the first monomer, a dicarboxylic acid having a sulfonate group is preferably used. As the dicarboxylic acid having a sulfonate group, for example, aromatic dicarboxylic acids such as sulfonated phthalic acid, sulfonated isophthalic acid and sulfonated terephthalic acid, are preferable. As the polycarboxylic acid as the second monomer, polycarboxylic acids having no sulfonate group, for example aromatic dicarboxylic acids such as phthalic acid, isophthalic acid and terephthalic acid are preferable. As the polyol as the second monomer, polyols having no sulfonate group, for example alkylene glycols such as ethylene glycol and propylene glycol are preferable.

In the dopant or a constituent monomer of the polymer dopant, the anionic group is not particularly limited as long as the anionic group can generate an anion in a dissociated state, and the anionic group may be a salt or ester of the above-mentioned anionic group.

For improving covering property of the first conductive polymer layer over the dielectric layer, it is preferable to use the first dopant having a relatively low molecular weight, such as a low-molecular-weight dopant. Here, dedoping of the first dopant may be suppressed by increasing a ratio of the first silane compound. In view of suppressing dedoping caused by a basic compound, it is preferable to use the first dopant having a relatively high molecular weight, such as a polymer dopant. In this case, a ratio of the silane compound in the first conductive polymer layer can also be decreased.

A weight average molecular weight of the first polymer dopant is, for example, from 1,000 to 1,000,000, inclusive. Use of a polymer dopant having such a molecular weight easily facilitates reduction of ESR.

A content of the dopant contained in the first conductive polymer layer ranges preferably from 10 parts by mass to 1,000 parts by mass, inclusive, with respect to 100 parts by mass of the first conductive polymer.

The first conductive polymer layer may further include, as necessary, a known additive and/or a known conductive material (e.g. manganese dioxide or TCNQ complex salt) other than the conductive polymer. A layer for improving adhesion, or the like may be interposed between the dielectric layer and the first conductive polymer layer.

(Second Conductive Polymer Layer)

The second conductive polymer layer contains a conductive polymer (second conductive polymer) and a basic compound, and may further contain a dopant (second dopant). In the second conductive polymer layer, the dopant may be contained with the conductive polymer doped with the dopant, or may be contained with the dopant bonded with the conductive polymer.

The conductive polymer and the dopant can be each selected from those exemplified for the first conductive polymer layer. For the second conductive polymer, polymerization of a precursor of the conductive polymer may be performed under existence of the dopant and/or the basic compound. Preferably, the second conductive polymer is synthesized before being deposited the first conductive polymer layer. For example, the second conductive polymer layer can be formed by use of a treatment liquid containing second conductive polymer in a form of, for example, a dispersion liquid or a solution. In this case, the second conductive polymer layer can be densified, and therefore withstand voltage characteristics can be further improved.

Thus, the second conductive polymer layer is preferably denser than the first conductive polymer layer. Denseness of the conductive polymer layer can be evaluated based on density obtained from, for example, electron micrographs of cross-sections of both the conductive polymer layers.

A content of the dopant contained in the second conductive polymer layer ranges preferably from 10 parts by mass to 1,000 parts by mass, inclusive, with respect to 100 parts by mass of the second conductive polymer.

(Basic Compound)

Examples of the basic compound include inorganic bases such as ammonia, and organic bases such as amines compounds. Among the basic compounds, amine compounds are preferable in view of obtaining a high effect of suppressing a reduction in conductivity. The amine compound may be any of a primary amine, a secondary amine and a tertiary amine. Examples of the amine compound may include aliphatic amines and cyclic amines. The basic compounds may be used alone or in combination of two or more basic compounds.

Examples of the aliphatic amine include alkylamines such as ethylamine, diethylamine, triethylamine, N,N-dimethyloctylamine and N,N-diethyloctylamine; alkanolamines such as ethanolamine, 2-ethylaminoethanol and diethanolamine; allylamines; and alkylenediamines such as N-ethylethylenediamine and 1,8-diaminooctane. Examples of the aliphatic amine include aminocyclohexane, diaminocyclohexane and isophoronediamine. Examples of the aromatic amine include aniline and toluidine.

The cyclic amine is preferably a cyclic amine having a five-membered to eight-membered (preferably five or six-membered) nitrogen-containing ring skeleton, such as pyrrole, imidazoline, imidazole, pyrazole, pyrazole, pyridine, pyrazine, pyrimidine or triazine. The cyclic amine may have one nitrogen-containing ring skeleton, or two or more (e.g. two or three) nitrogen-containing ring skeletons. When the cyclic amine has two or more nitrogen-containing ring skeletons, the nitrogen-containing ring skeletons may be the same or different.

The amine compound may have a substituent as necessary.

The amine compound contained in the second conductive polymer layer can be examined by, for example, gas chromatography (GC).

In view of easily reducing ESR, a content of the basic compound in the second conductive polymer layer ranges preferably from 5 parts by mass to 200 parts by mass, inclusive, or from 10 parts by mass to 100 parts by mass, inclusive, with respect to 100 parts by mass of the conductive polymer.

The second conductive polymer layer may contain a silane compound (second silane compound). However, in view of improving ESR of the whole conductive polymer layer, it is preferable that the second conductive polymer layer does not contain the silane compound, or a proportion of the silane compound (first silane compound) in the first conductive polymer layer is higher than a proportion of the silane compound (second silane compound) in the second conductive polymer layer. In this case, dedoping of the dopant in the first conductive polymer layer by the basic compound contained in the second conductive polymer is easily suppressed. In addition, since the proportion of the silane compound in the second conductive polymer layer is low, an increase in ESR is easily suppressed.

Dedoping of the first dopant is apt to be particularly noticeable when a dopant having a relatively small molecular weight, such as a low-molecular-weight dopant, is used. However, use of such a first dopant is advantageous for forming the first conductive polymer layer in as many regions as possible on a surface of the dielectric layer. In general, occurrence of dedoping of a dopant increases ESR. Thus, in such a case, by using a second dopant having a relatively large molecular weight, such as a polymer dopant, in the second conductive polymer layer, dedoping of the dopant from the second conductive polymer layer can be suppressed, so that an increase in ESR can be suppressed. In addition, the second conductive polymer layer is formed by use of the second conductive polymer polymerized in advance, excellent withstand voltage characteristics are easily obtained. Thus, when the proportion of the silane compound in the second conductive polymer layer is decreased, an effect of suppressing ESR becomes noticeable. Accordingly, when the second dopant having a molecular weight larger than that of the first dopant is used, it is preferable that the proportion of the second silane compound in the second conductive polymer layer is decreased (or the second silane compound is not included).

The second silane compound can be appropriately selected from those exemplified for the first silane compound.

The second conductive polymer layer may further include, as necessary, a known additive and a known conductive material (e.g. manganese dioxide or TCNQ complex salt) other than the conductive polymer.
(Others)

The second conductive polymer layer may be formed of one layer, or may be formed of a plurality of layers.

Preferably, the second conductive polymer layer includes a first layer containing a basic compound, and a second layer containing the second conductive polymer formed on the first layer. The second layer is only required to contain at least the second conductive polymer, and may contain the second conductive polymer and the basic compound. The second layer may further contain a second dopant. The first conductive polymer layer and the second layer are each apt to be anionic, and thus formation of the second layer directly on the first conductive polymer layer results in low covering property. By providing the first layer, affinity between the first conductive polymer layer and the second layer can be improved, and therefore covering property of the second conductive polymer layer over the first conductive polymer layer is easily further improved.

The second conductive polymer layer may include a plurality f first layers and a plurality of second layers. It is desirable to alternately form the first layers and the second layers. Stacking of only the second layers makes it difficult to cover a lower layer with an upper layer due to electric charge repulsion. By disposing the first layer between the second layers, the lower second layer can be sufficiently covered with the upper second layer with the first layer interposed between the second layers, covering property of the second conductive polymer layer is easily further improved.

In the second conductive polymer layer, the basic compound in the first layer may move to the second layer in formation of the first layer, in stacking of the second layer, or the like. In the second conductive polymer layer, a concentration of the basic compound in the first layer may be higher than a concentration of the basic compound in the second layer.

In view of suppressing a leakage current and further improving withstand voltage characteristics, a thickness (average thickness) of the second conductive polymer layer is preferably greater than a thickness (average thickness) of the first conductive polymer layer. This configuration is particularly effective when the first conductive polymer layer and second conductive polymer layer have mutually different configurations and roles. In a preferred exemplary embodiment, the first conductive polymer layer is formed by, for example, polymerizing a precursor of the first conductive polymer on the dielectric layer to generate the first conductive polymer, and depositing the generated first conductive polymer so as to cover the dielectric layer. The second conductive polymer layer is formed by use of a treatment liquid containing the second conductive polymer. Here, the thickness of the first conductive polymer layer and the thickness of the second conductive polymer layer satisfy a relationship as described above. When the first conductive polymer layer is formed by polymerization on the dielectric layer, the generated first conductive polymer easily penetrates into pores of a porous anode body, so that the first conductive polymer layer can be formed even on complicated inner wall surfaces of the pores. However, the first conductive polymer layer obtained in this method is apt to have a low density. Thus, when the second conductive polymer layer is formed by use of the second conductive polymer layer polymerized in advance, and the thickness of the second conductive polymer layer is made greater than the thickness of the first conductive polymer layer, withstand voltage characteristics and leakage current characteristics of the whole conductive polymer layer can be further improved.

The average thickness of the second conductive polymer layer ranges, for example, from 5 μm to 100 μm, inclusive, preferably from 10 μm to 50 μm, inclusive. A ratio of the average thickness of the second conductive polymer layer to the average thickness of the first conductive polymer layer is, for example, 5 times or more, preferably 10 times or more. When the average thickness and the ratio of the average thickness fall within such a range, strength of the conductive polymer layer as a whole can be increased.
(Cathode Layer)

The carbon layer is satisfactory as long as the carbon layer has conductivity, and the carbon layer can be configured, for example, with use of a conductive carbon material such as graphite. For the silver paste layer, for example, there can be used a composition including a silver powder and a binder resin (e.g., an epoxy resin). The cathode layer is not limited to this configuration and is satisfactory as long as the cathode layer is configured to have a function of power collection.

The anode terminal and the cathode terminal can be configured to include, for example, a metal such as copper or a copper alloy. As a material of the resin outer packing, there can be used, for example, an epoxy resin.

The electrolytic capacitor of the present disclosure is not limited to the electrolytic capacitor having the configuration described above, and can be various electrolytic capacitors. Specifically, the present disclosure can also be applied to, for example, a wound electrolytic capacitor and an electrolytic capacitor including a metal powder sintered body as the anode body.

[Method for Manufacturing Electrolytic Capacitor]

An electrolytic capacitor can be manufactured through a step (first step) of forming a first conductive polymer layer on a dielectric layer of an anode body provided with the dielectric layer; and a step (second step) of forming a second conductive polymer layer on the first conductive polymer layer. The method for manufacturing an electrolytic capacitor may include a step of preparing an anode body and a step of forming a dielectric layer on the anode body before the first step. The method may further include a step of forming a cathode layer.

Hereinafter, the steps are described in more detail.
(Step of Preparing Anode Body)

In this step, the anode body is formed by a publicly known method according to a type of the anode body.

The anode body can be prepared by, for example, roughening a surface of a foil-like or plate-like substrate made of a conductive material. The roughening is satisfactory as long as irregularities are formed on the surface of the substrate and may be performed, for example, by subjecting the surface of the substrate to etching (e.g., electrolytic etching)

or by depositing particles of the conductive material on the surface of the substrate by use of a gas phase method such as vapor deposition.

In addition, a valve metal powder is prepared, and molded into a desired shape (e.g. block shape) while a rod-like anode lead is embedded in the powder at one end of the anode lead in a longitudinal direction, so that a molded body is obtained. This molded body may be sintered to form an anode body of porous structure in which an anode lead is embedded at one end of the anode lead.

(Step of Forming Dielectric Layer)

In this step, a dielectric layer is formed on the anode body. The dielectric layer is formed by anodizing the anode body through an anodizing treatment or the like. The anodization can be performed by a known method, for example an anodizing treatment. The anodizing treatment can be performed by, for example, immersing the anode body in an anodizing solution to impregnate, with the anodizing solution, a surface (a more inside surface, i.e., an inner wall surface of pores or pits) of the anode body, and applying a voltage between the anode body as an anode and a cathode immersed in the anodizing solution. It is preferable to use, for example, a phosphoric acid aqueous solution as the anodizing solution.

(Step of Forming First Conductive Polymer Layer (First Step))

In the first step, the first conductive polymer layer containing the first conductive polymer and the silane compound is formed so as to cover at least a part of the dielectric layer. The first conductive polymer layer may be formed by using a dispersion liquid or solution which contain constituent components of the first conductive polymer layer such as the first conductive polymer, the silane compound and the dopant.

In a preferred exemplary embodiment, the first conductive polymer layer is formed by polymerizing a precursor of the first conductive polymer. That is, the precursor of the first conductive polymer is polymerized on the dielectric layer. The dielectric layer is formed on a surface of the anode body which has many pores and pits (a surface including inner wall surfaces of pores and pits of the anode body). Thus, by polymerizing the precursor on the dielectric layer, the first conductive polymer layer is easily formed deeply in pores and pits. The polymerization can be performed by chemical oxidation polymerization. The polymerization may be performed under existence of a dopant.

The polymerization may be performed under existence of a silane compound. In addition, the first conductive polymer layer may be formed by polymerizing the precursor of the first conductive polymer, and the first conductive polymer layer may be coated or impregnated with the silane compound to include the silane compound in the first conductive polymer layer. The first conductive polymer layer formed by polymerization under existence of the silane compound may be coated or impregnated with the silane compound.

The polymerization may be performed under existence of a catalyst for accelerating the polymerization. As the catalyst, ferrous sulfate, ferric sulfate or the like can be used. In addition, an oxidant such as a persulfate (e.g. ammonium persulfate, sodium persulfate or potassium persulfate), or a metal sulfonate may be used. The polymerization may be performed under existence of a dopant and/or a silane compound as necessary.

For the polymerization, a solvent (first solvent) for dissolving or dispersing a precursor of the conductive polymer may be used as necessary. Examples of the first solvent include water, a water-soluble organic solvent, and a mixture of water and a water-soluble organic solvent.

(Step of Forming Second Conductive Polymer Layer (Second Step))

In the second step, a second conductive polymer layer containing a second conductive polymer and a basic compound is formed on the first conductive polymer layer so as to cover at least a part of the first conductive polymer layer. The second conductive polymer layer may be formed by polymerizing a precursor of the second conductive polymer on the first conductive polymer layer. The polymerization may be performed under existence of a dopant. However, for forming the second conductive polymer layer having dense film quality, it is preferable to form the second conductive polymer layer by use of a treatment liquid containing the second conductive polymer. The treatment liquid may further contain a dopant. The second conductive polymer layer is formed by, for example, impregnating the anode body, which is obtained in the first step, with a treatment liquid, and then performing drying. The anode body obtained in the first step is immersed in the treatment liquid, or the treatment liquid is dropwise added to the anode body obtained in the first step, so that the anode body is impregnated with the treatment liquid.

The treatment liquid containing the second conductive polymer may contain a basic compound, but the second conductive polymer and the basic compound may be separately deposited on the first conductive polymer layer. The second step includes, for example, a step (step A) of impregnating the anode body, which is obtained in the first step, with a first treatment liquid containing a basic compound, and then performing drying, and after that, impregnating the anode body with a second treatment liquid containing the second conductive polymer, and then performing drying. Through step A, the second conductive polymer layer containing a second conductive polymer and a basic compound is formed.

In drying of the anode body in the second step and step A, the anode body may be heated as necessary.

Step A may be repeated. Here, the second conductive polymer layer can be formed in which each of first layers containing a basic compound and each of second layers containing a second conductive polymer are alternately stacked. By repeating step A, covering property of the first conductive polymer layer with the second conductive polymer layer can be improved.

As the first treatment liquid containing a basic compound, for example, a solution of the basic compound is used. As a solvent (second solvent) to be used for the solution, water is preferable, and a mixed solvent of water and an organic solvent may be used. Examples of the organic solvent include aliphatic alcohols having 1 to 5 carbon atoms, acetone, acetonitrile, benzonitrile, N,N-dimethylformamide and dimethyl sulfoxide. As the organic solvent, one solvent may be used alone, or two or more solvents may be used in combination.

Preferably, a dispersion liquid or solution containing the second conductive polymer is used as the treatment liquid (second treatment liquid or the like) containing the second conductive polymer. The treatment liquid contains the second conductive polymer and a solvent (third solvent). The treatment liquid containing the second conductive polymer may contain a basic compound and/or a second dopant as necessary. By using such a treatment liquid, a dense second conductive polymer layer can be easily formed, and excellent withstand voltage characteristics are easily obtained. Examples of the third solvent may include water, organic solvents and mixtures of water and the organic solvent. The organic solvent can be appropriately selected from those exemplified for the second solvent.

The second conductive polymer and/or dopant dispersed in the dispersion liquid is preferably in a form of particles (or a powder). An average particle size of the particles dispersed in the dispersion liquid ranges preferably from 5 nm to 500 nm, inclusive. The average particle size can be determined, for example, from a particle size distribution obtained by a dynamic light scattering method.

The treatment liquid containing the second treatment liquid can be obtained by dispersing or dissolving the second conductive polymer, and the dopant and/or basic compound as necessary in a solvent. For example, a dispersion liquid (dispersion liquid A) obtained by removing impurities from a polymerization liquid of the second conductive polymer, and then mixing the dopant with the polymerization liquid, may be used as the treatment liquid containing the second conductive polymer. Alternatively, a dispersion liquid (dispersion liquid B) obtained by removing impurities from a polymerization liquid formed by polymerization of the second conductive polymer under existence of the dopant may be used as the treatment liquid containing the second conductive polymer. In using such a dispersion, those exemplified for the third solvent may be used as a solvent during the polymerization, or the third solvent may be added in removal of impurities after polymerization. Further, the third solvent may be added to dispersion liquid A and dispersion liquid B. A basic compound may be added to any of the dispersion liquids as necessary.

When the second conductive polymer layer contains a second silane compound, the second conductive polymer layer formed may be coated or impregnated with the second silane compound. In addition, the second silane compound may be added to the treatment liquid containing the second conductive polymer, such as the second treatment liquid, or may be added to the first treatment liquid.

The first treatment liquid and the second treatment liquid may contain known additives as necessary. An acid component may be added to the first treatment liquid as necessary.

(Step of Forming Cathode Layer)

In this step, a cathode layer is formed by sequentially stacking a carbon layer and a silver paste layer on the surface (preferably of the conductive polymer layer formed) of the anode body obtained in the second step.

EXAMPLES

Hereinafter, the present disclosure is specifically described with reference to examples and comparative examples. The present disclosure, however, is not limited to the examples below.

Example 1

Electrolytic capacitor 1 shown in FIGURE was manufactured in the manner described below, and characteristics of the electrolytic capacitor were evaluated.

(1) Step of Preparing Anode Body 11

A tantalum metal powder was prepared, and the powder was molded into a rectangular shape while rod-like anode lead 16 was embedded in the metal powder at one end of the anode lead in a longitudinal direction. The molded body was sintered to prepare anode body 11 in which anode lead 16 was embedded at the one end.

(2) Step of Forming Dielectric Layer 12

Anode body 11 was immersed in a phosphoric acid solution in a concentration of 0.02% by mass, and a voltage of 100 V was applied to anode body 11 to form dielectric layer 12 composed of $Ta_2O_5$ on a surface of anode body 11.

(3) Step of Forming First Conductive Polymer Layer 1 part by mass of 3,4-ethylenedioxythiophene as a polymerizable monomer, 0.9 parts by mass of ferric paratoluenesulfonate as a dopant component, 5 parts by mass of 3-glycidoxypropyltrimethoxysilane as a first silane compound, and 11.5 parts by mass of n-butanol as a first solvent were mixed to prepare a solution. Anode body 11 provided with dielectric layer 12 obtained in step (2) was immersed in the resulting solution, taken out from the solution, and then dried. The immersion in the solution and the drying were repeated again, so that a first conductive polymer layer was formed so as to cover a surface of dielectric layer 12. An average thickness of the first conductive polymer layer was measured by a scanning electron microscope (SEM), and as a result of the measurement, it was found that the average thickness was about 1 μm.

(4) Step of Forming Second Conductive Polymer Layer

Anode body 11 obtained in step (3) was immersed in an aqueous solution (first treatment liquid) containing N,N-dimethyloctylamine as a basic compound in a concentration of 5% by mass, taken out from the solution, and dried. The anode body was then immersed in a second treatment liquid, which is in a state of dispersion liquid, containing poly(3,4-ethylenedioxythiophene) (PEDOT) as a second conductive polymer, and polystyrene sulfonic acid (PSS) as a second polymer dopant, taken out from the second treatment liquid, and dried. The immersion in the first treatment liquid and the drying, and the immersion in the second treatment liquid and the drying were alternately repeated multiple times, so that a second conductive polymer layer was formed so as to cover the surface of first conductive polymer layer. An average thickness of the second conductive polymer layer was measured in a manner similar to that for the first conductive polymer layer, and as a result of the measurement, it was found that the average thickness was about 30 μm. Thus, the first conductive polymer layer and the second conductive polymer layer were formed so as to cover the surface of dielectric layer 12.

A second treatment liquid was prepared in accordance with a procedure described below.

A 3,4-ethylenedioxythiophene monomer was added, under stirring, to an aqueous solution containing polystyrene sulfonic acid (sulfonation degree: 100 mol %), and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained PEDOT as a second conductive polymer and PSS as a second dopant. Purified water was added to the resulting solution, and the resultant mixture was homogenized by a high-pressure homogenizer and was further subjected to filtration by a filter to prepare a second treatment liquid. A content of PSS in the second treatment liquid was 4 parts by mass with respect to 100 parts by mass of PEDOT.

A cross-section of each of the first conductive polymer layer and the second conductive polymer layer which is cut in a thickness direction was observed with a scanning electron microscope, and as a result of the observation, it was found that a coarse first conductive polymer layer was thinly formed on a dielectric layer side. In addition, a dense second conductive polymer layer was formed on a side opposite to the dielectric layer so as to cover a surface of the first conductive polymer layer.

(5) Step of Forming Cathode Layer

A dispersion liquid obtained by dispersing graphite particles in water was applied to anode body 11 obtained in step (4), and was dried in air to form carbon layer 14 on at least a surface of the second conductive polymer layer. Drying was carried out at a temperature ranging from 130° C. to 180° C. for a period ranging from 10 minutes to 30 minutes.

A silver paste containing silver particles and a binder resin (epoxy resin) was applied onto a surface of carbon layer 14, and the layer coated with the silver paste was heated at a temperature ranging from 150° C. to 200° C. for a period ranging from 10 minutes to 60 minutes to cure the binder resin, so that silver paste layer 15 was formed. Thus, a cathode layer that was configured to include carbon layer 14 and silver paste layer 15 was formed.

(6) Assembling of Electrolytic Capacitor

Further, anode terminal 17, adhesive layer 18 and cathode terminal 19 were disposed on the anode body obtained in step (5), and sealed with an outer packing resin to manufacture an electrolytic capacitor.

Example 2

Except for using 1,8-diaminooctane in place of N,N-dimethyloctylamine in step (4), a procedure similar to that in Example 1 was carried out to prepare an electrolytic capacitor.

Comparative Example 1

Except that a first treatment liquid was not used, and immersion in a second treatment liquid and drying were repeated to form a second conductive polymer layer in step (4), a procedure similar to that in Example 1 was carried out to prepare an electrolytic capacitor.

Comparative Example 2

Except for using a first silane compound in step (3), a procedure similar to that in Example 1 was carried out to prepare an electrolytic capacitor.

Comparative Example 3

Except for using a first silane compound in step (3), a procedure similar to that in Comparative Example 1 was carried out to prepare an electrolytic capacitor.

(Evaluation)

Evaluations described below were performed by use of the electrolytic capacitors of examples and comparative examples.

(a) Withstand Voltage Characteristics

A voltage of the electrolytic capacitor was increased at a rate of 1 V/s, and a voltage value (V) was measured at a time when a current value exceeded 0.5 A. A ratio of a voltage value to a voltage value in Comparative Example 3 (if the voltage value in Comparative Example 3 is assumed to be 1) was calculated, and defined as an evaluation index for withstand voltage characteristics. It is meant that withstand voltage characteristics are improved as this evaluation index increases.

(b) Capacitance Residual Ratio (Cap)

A capacitance value was measured after a voltage of 16 V was applied to the electrolytic capacitor at a temperature of 125° C. for 500 hours. A ratio of a capacitance value to a capacitance value of the capacitor in Comparative Example 3 (if the capacitance value in Comparative Example 3 is assumed to be 1), which is referred as capacitance residual ratio, was determined. It is meant that reliability and a life of the electrolytic capacitor are improved as the value of the capacitance residual ratio increases.

Table 1 shows results of the examples and the comparative examples. A1 and A2 denote Examples 1 and 2, respectively, and B1 to B3 denote Comparative Examples 1 to 3, respectively.

TABLE 1

|    | Withstand voltage characteristics | Capacitance residual ratio |
|----|-----------------------------------|----------------------------|
| A1 | 1.8                               | 1.8                        |
| A2 | 1.8                               | 1.9                        |
| B1 | 1.3                               | 1.3                        |
| B2 | 1.5                               | 1.1                        |
| B3 | 1                                 | 1                          |

As shown in Table 1, the electrolytic capacitors of examples exhibited higher withstand voltage characteristics as compared to comparative examples. In addition, the electrolytic capacitors of examples exhibited a higher capacitance value as compared to comparative examples even after application of a high voltage for a long time, and had a long life and excellent reliability.

The electrolytic capacitor according to an exemplary embodiment of the present disclosure can be used for various uses in which high withstand voltage characteristics are required.

What is claimed is:

1. An electrolytic capacitor comprising:
   an anode body;
   a dielectric layer formed on the anode body;
   a first conductive polymer layer covering at least a part of the dielectric layer; and
   a second conductive polymer layer covering at least a part of the first conductive polymer layer, wherein:
   the first conductive polymer layer contains a first conductive polymer and a first silane compound, and
   the second conductive polymer layer contains a second conductive polymer and a basic compound.

2. The electrolytic capacitor according to claim 1, wherein the basic compound is an amine compound.

3. The electrolytic capacitor according to claim 1, wherein the first silane compound is a silane coupling agent.

4. The electrolytic capacitor according to claim 1, wherein:
   the second conductive polymer layer includes:
      one or more first layers containing the basic compound; and
      one or more second layers formed on the first layer and containing the second conductive polymer.

5. The electrolytic capacitor according to claim 4, wherein the second conductive polymer layer is constituted by alternately stacking each of the one or more first layers and each of the one or more second layers.

6. The electrolytic capacitor according to claim 1, wherein the second conductive polymer layer is denser than the first conductive polymer layer.

7. The electrolytic capacitor according to claim 1, wherein a thickness of the second conductive polymer layer is greater than a thickness of the first conductive polymer layer.

8. The electrolytic capacitor according to claim 1, wherein:
- the second conductive polymer layer further contains a second silane compound, and
- a proportion of the first silane compound in the first conductive polymer layer is higher than a proportion of the second silane compound in the second conductive polymer layer.

9. The electrolytic capacitor according to claim 1, wherein:
- the first conductive polymer layer contains a first dopant,
- the second conductive polymer layer contains a second dopant, and
- a molecular weight of the first dopant is smaller than a molecular weight of the second dopant.

10. The electrolytic capacitor according to claim 1, wherein:
- the first conductive polymer is obtained by polymerizing a precursor of the first conductive polymer on the dielectric layer, and
- the second conductive polymer layer is formed by use of a dispersion liquid or solution containing the second conductive polymer.

\* \* \* \* \*

UNITED STATES PATENT AND TRADEMARK OFFICE
CERTIFICATE OF CORRECTION

PATENT NO. : 10,679,795 B2  
APPLICATION NO. : 15/841500  
DATED : June 9, 2020  
INVENTOR(S) : Nobuyuki Yamaguchi et al.

Page 1 of 1

It is certified that error appears in the above-identified patent and that said Letters Patent is hereby corrected as shown below:

In the Claims

At Column 16, Claim number 1, Line number 46: Please insert the following between "a basic compound" and ".":
-- , and
the first silane compound is different from the basic compound --

Signed and Sealed this  
First Day of December, 2020

Andrei Iancu  
*Director of the United States Patent and Trademark Office*